May 11, 1937. J. B. EISEN 2,080,256
METHOD OF MAKING CENTER SPOT CROWNS
Filed May 6, 1936

Jay Bernard Eisen
INVENTOR

ATTORNEY.

Patented May 11, 1937

2,080,256

UNITED STATES PATENT OFFICE 2,080,256

METHOD OF MAKING CENTER SPOT CROWNS

Jay Bernard Eisen, Yonkers, N. Y., assignor to Ferdinand Gutmann & Co., Brooklyn, N. Y., a corporation of New York Application May 6, 1936, Serial No. 78,126

5 Claims. (Cl. 113—80)

The invention relates to the method of making center spot crowns, and more particularly to a method of securing the center spot disc to the cushion disc of a center spot crown of the type shown in the patent to John Alberti, No. 1,199,026 of September 19th, 1916.

The commercial production of center spot crowns of the type above referred to has heretofore been impossible. Albuminous adhesives have low viscosity and no inherent adhesiveness until subjected to a temperature at, or above that at which albumen coagulates.

When it is attempted to apply a disc of center spot material to a surface coated with an albuminous adhesive, the disc has a tendency to side slip, so that it is practically impossible to produce such crowns without having a very high percentage of center spots off center in relation to the cushion disc. Furthermore, a lack of inherent tackiness in an albumen adhesive prevents the center spot from being secured to the cushion disc by means of the adhesive with sufficient tenacity to permit the conveyance of the crown with the center spot upon the cushion disc, to the collecting drum in which heat and pressure are simultaneously applied for the purpose of pressing the center spot firmly against the cushion disc, and holding it under pressure during a time interval sufficient to coagulate the albumen and form a permanent bond.

The application of a viscous adhesive to the strip material would cause a rapid fouling of the cutting dies of a machine so as to interfere with the production of the crowns at a speed made necessary by the low prices at which such crowns are sold. Furthermore, this practice would lead to the removal of a substantial percentage of the adhesive applied to the strip, resulting in an uneven distribution thereof and an absence of continuity of the bond between the center spot disc and the cushion disc.

I have developed a method of producing center spot crowns using an albuminous adhesive which overcomes the difficulty of side slipping of the center spot disc when applying it to the cushion disc, thus reducing the number of crowns in which the center spot is misplaced or off center to so small a percentage of the product of a machine as to make the commercial production of such crowns practicable.

This method may be practiced upon existing machines long used in applying center spot discs to the cushion discs of crowns.

By my present invention, I am enabled to produce center spot crowns using an albuminous adhesive by a method differing from the other method above referred to. The method of my present invention, however, would require a reduction in the speed of production, if old and well known machines are employed in the practice thereof, but by re-construction of the machines, such crowns may be produced at commercial speeds.

The invention consists primarily in a method of making center spot crowns consisting of applying to the cushion disc of a crown, a solvent which will partially emulsify albumen, cutting a center spot disc from a strip of facing material having a thin stratum of adhesive containing albumen and a plastic carrier upon one surface thereof, depositing said disc upon the cushion disc of a crown cap with said coating engaging the solvent upon the cushion disc, and thereafter subjecting said center spot to pressure and heat sufficient to coagulate the albumen in said coating; and in such other novel steps and practices as are hereinafter set forth and described, and more particularly pointed out in the claims hereto appended.

Referring to the drawing.

Like numerals refer to like parts throughout the several views.

Figure 1:
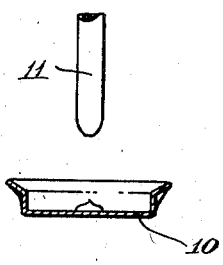
Fig. 1 is a view showing adhesive being dropped in the metal shell of a crown cap.
Figure 2:
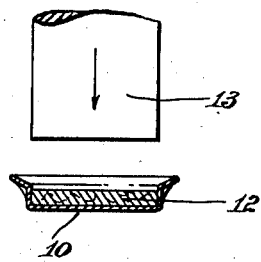
Fig. 2 is a view showing the depositing of a cushion disc upon said adhesive in the metal shell.
Figure 3:
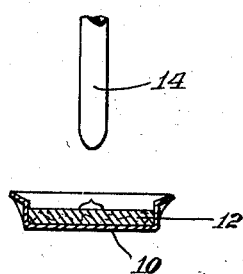
Fig. 3 is a view showing the application of a solvent which will partially emulsify albumen, upon the cushion disc while in the shell.
Figure 4:
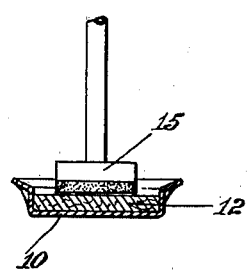
Fig. 4 shows the spreading of said solvent about the exposed surface of said cushion disc.
Figure 5:
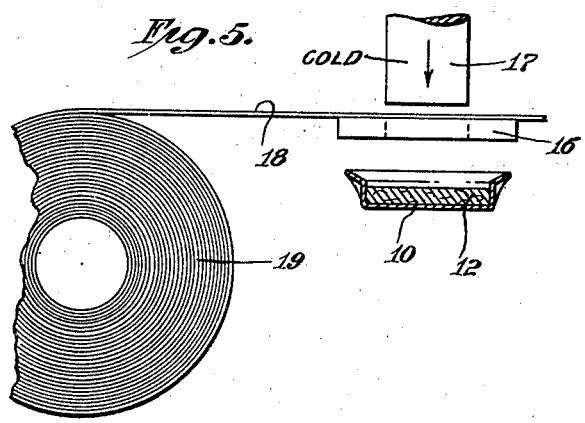
Fig. 5 shows the cutting of a center spot disc from a strip of facing material and the depositing of said disc upon the cushion disc of a crown cap.

In the practice of the method of the invention, two procedures may be followed. In the first procedure, the cushion disc is cemented to the metal shell of the crown and the center spot is secured to the cushion disc by a continuing operation in a single machine. In the second procedure, the cushion disc is secured to the metal shell in one stage in one machine, and the center spot is secured to the cushion disc in a second stage and in a different machine.

By the first procedure, one handling of the decorated metal shell is avoided. This is desirable. By the second procedure, the control of the temperature and the time intervals is simplified and smaller machines may be used. The result of both procedures, so far as the finished product is concerned, is the same.

In the first or continuing operation procedure, I first apply to the metal shell 10 of a crown, a drop of albuminous adhesive by means of an ordinary dropper 11. A cushion disc 12 is then deposited upon the adhesive in the metal shell by means of the usual feed mechanism, shown conventionally at 13.

A water or other solvent of casein is then applied to the exposed face of the cushion disc 12 by means of a dropper of the construction usually employed in depositing adhesive in the metal shell, such a dropper being shown conventionally at 14. This solvent is then distributed about the cushion disc by means of a spreader shown conventionally at 15, such spreaders being commonly used in the assembly of crowns.

The crown with the water or other solvent thereon, is then positioned below a cold die mechanism consisting of a die 16 and a cutting plunger 17.

A strip of facing material 18 is fed across the die 16 below the plunger 17, and as the crown comes to rest below the die 16, a center spot disc is cut from the strip and deposited upon the film of water or other solvent already upon the cushion disc.

In feeding the strip 18, any desired type of feeding mechanism may be used, such mechanisms having been used for many years in bottle cap assembling machines in feeding the strips from which paper collets were cut and deposited in the metal shell, and also in feeding strip material for producing center spot crowns.

The mechanisms employed are immaterial to the invention. The strip 18, which is drawn from a roll 19, may be of varnished paper, aluminum foil, tin foil or any other strip material suitable for use in producing center spot crowns. These materials are also old and well known, varnished kraft or express paper being extensively used in producing center spot crowns for use with soft drinks, fruit juices and wines; aluminum foil being extensively used in crowns for bottling beer and other malt beverages, and tin foil being extensively used in crowns for bottling mineral waters and various chemicals. Other types of strip material are also used for special purposes.

This strip material 18 is coated upon one face thereof with an adhesive stratum composed of albuminous material and a plastic carrier, such as latex, or such materials with casein.

In producing the strip material, an admixture of albumen and latex, or albumen, casein and latex, in emulsion is applied to the strip material and the fluid vehicle removed by evaporation, so that the admixture as a whole is non-tacky, thus permitting it to be collected in roll form, fed in relation to the dies 16 and 17, and a center spot disc to be cut therefrom without fouling the die 16 or removing any of the surface coating from the strip as a result of its contact with the die 16.

The coating is a homogeneous admixture, the plastic content serving as a carrier for the adhesive material, albumen or albumen and casein. This coating is substantially a solid, although it may, and probably does, retain a small percentage of the liquid vehicle of the emulsion, since the latex remains plastic notwithstanding long aging of the strip material or of crowns having center spots applied thereto by means of said admixture. When the center spot discs are cut from the strip, the coating is non-tacky and non-viscous.

Following the cutting of a center spot disc from the strip, the plunger die deposits the disc upon the cushion disc, the surface of which has the water or other solvent thereon. Immediately that the center spot contacts with the water or other solvent upon the cushion disc, the plastic material or latex, notwithstanding the presence of water upon the cushion disc, and possibly because of the presence thereof, adheres lightly to the center spot disc without any side slipping of said disc. The water upon the disc is quickly absorbed by the albuminous constituent of the admixture, and by the casein constituent when such is used, thus partially emulsifying the albumen and moistening the casein so as to make it tacky, thus increasing the effectiveness of the bond as compared with the use of latex alone. Water or other vehicle is absorbed by the albumen, or the albumen and the casein after the application of the center spot disc to the cushion disc, and to ensure the presence of sufficient water to permit the subsequent coagulation of the albumen, a dwell of several seconds is allowed before the final step of the method which consists in applying heat and pressure in the collecting drum of a machine to the metal shell, and also to the center spot disc. If this time interval is sufficient to permit the absorption of all of the water by the albumen and by the casein, the final or coagulation stage requires less time than if such absorption is not completed when the crown reaches the final stage.

Figure 6:
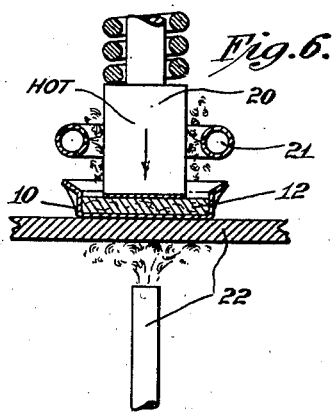
Fig. 6 shows the final stage of applying heat and pressure to the center spot disc for coagulating the albumen in the adhesive stratum.

The final stage is illustrated in Fig. 6 of the drawing, in which a heated spring pressed plunger 20 is used to apply heat to the adhesive stratum and to force it into intimate engagement with the cushion disc while the albumen is being coagulated and the casein is being dried. At 21 I have shown a conventional means for heating the plunger 20. At 22 I have shown conventionally a heater for applying heat to the top of the metal shell for the purpose of coagulating the albumen in the adhesive used for bonding the cushion disc 12 to the metal shell 10.

The time interval ordinarily required in assembling crowns in which an albuminous adhesive is used for securing the cushion disc in the metal shell is between eight and nine seconds. The temperatures required in the finishing operation must be such as to quickly bring the albumen to a temperature of 140° F. or more. Temperatures in excess of 140° F. are developed in the plunger 20 and in the heated plate 22 in order to ensure the rapid bringing of the albuminous adhesives used to the coagulating temperature.

When the first procedure above referred to is followed, the time intervals required to coagulate the albumen between the cushion disc and the metal shell, and the albumen of the adhesive stratum between the center spot disc and the cushion disc may vary, so that considerable nicety in the control of the temperatures of the presser plunger 20 and of the heating plate 22 may be required. If the time required to partially emulsify and then coagulate the albuminous constituent of the adhesive stratum bonding the center spot disc to the cushion disc is greater than that required to coagulate the albumen between the cushion disc and the metal shell, it is necessary to either increase the temperature of the plunger 20 or to increase the time interval during which the crown is subjected to heat and pressure in the final stage of the method.

When the second procedure above referred to is followed, the cushion disc is bonded to the metal shell in one machine and the assembled crown is fed to another machine in which the center spot is applied to the cushion disc. The procedures, in other respects, are the same. The first procedure has the advantage that the metal shell is subjected to tumbling in only one feed hopper, thus reducing likelihood of mutilation of the decoration thereon. By the second procedure, any nicety in the control of temperatures and time intervals is avoided.

In the practice of the method of the invention, the adhesive coating upon the strip 18 is approximately .002 of an inch in thickness, so that the moisture may readily penetrate or be distributed by capillary attraction, throughout the albuminous or albuminous and casein constituents of the coating.

The adhesive stratum which I have found most effective in use is composed of an intimate admixture of twenty-seven parts of latex, nine parts of casein and eight to sixteen parts of albumen by weight of the solid constituents of the admixture. I have found that while albumen in excess of sixteen parts may be incorporated in the admixture, such excess does not increase the effectiveness of the bond secured. It does not, however, seem to effect a poorer bond.

The constituents of the adhesive are so thoroughly admixed before application to the strip as to ensure homogeneity throughout the coating, which ensures an effective distribution of the moisture applied to the cushion disc throughout the mass so as to secure a bonding operation throughout the entire area of the center spot disc.

The albumen upon coagulation, undergoes chemical reactions which make it insoluble. The casein sets as a result of the evaporation of the vehicle absorbed thereby from the water film upon the cushion disc. The latex, being free of any vulcanizing constituents, undergoes no chemical reactions whatever, but remains plastic, although the extent of its plasticity is modified by the dried casein and the coagulated albumen distributed throughout the latex. Latex itself, I have found, does not give a sufficiently tenacious bond to permit its use in securing center spots to the cushion discs of bottle crowns, although it does adhere to the cushion disc when the center spot disc is first applied thereto, notwithstanding the presence of water upon the disc, with sufficient tenacity to avoid side slipping of the center spot or its displacement while the crown is being conveyed from the cutting dies to the heat and pressure stage. The casein in the admixture apparently supplements the action of the latex in preventing such displacement of the center spot.

The adhesive stratum is, at all times, non-fusible. In the finished crown, the coagulated albumen is relied upon to secure an effective permanent bond between the center spot disc and the cushion disc, this bond being supplemented by the solidification by drying of the casein. The latex is used primarily to permit the use of albumen in a non-viscous condition, thus permitting the coating of the strip material 18 with an adhesive, the main active agent of which is albumen. The latex is also used to secure an initial bond between the center spot disc and the cushion disc when the center spot disc is pressed upon the cushion disc by the plunger die 17.

In the finished product, the presence of latex ensures continuing flexibility throughout the center spot, the latex modifying the bond secured by the other constituents and preventing the adhesive stratum from becoming hard and brittle with the possibility of granulation or pulverization thereof when the heavy pressures used in applying crowns to bottles are developed in the bottling or crowning machine. In fact, while the adhesive stratum is sufficiently thin and sufficiently dense to practically eliminate all possibility of extrusion of the adhesive from between the center spot disc and the cushion disc, the presence of the latex ensures plasticity in any adhesive which might be so extruded, so as to prevent such granulation or pulverization. Furthermore, in the event that a small percentage of the adhesive should be so extruded, the inherent lack of tackiness in the latex, the coagulated condition of the albumen and the dryness or lack of moisture in the casein avoids any possibility of the cushion disc sticking to the neck of a bottle.

While albumen coagulates at about 140° F., the plunger 20 should be maintained at a temperature considerably above the coagulating temperature of albumen because of heat losses in transmitting heat from the plunger to the adhesive stratum between the center spot disc and the cushion disc, and the desirability of coagulating the albumen as rapidly as possible. Care should be taken, however, to maintain the plunger at an elevated temperature which will not deleteriously affect the cork or composition cork of the cushion disc.

If all of the water or other solvent applied to the cushion disc is not absorbed by the albumen and the casein before the crown reaches the heat and pressure stage, the application of heat to the assembly will facilitate the completion of the absorption of said water or other solvent. The water or other solvent absorbed by the casein is driven off by the heat, and some of such water will also be absorbed by the albumen and assist in coagulating same.

The plunger die 17 may have a flat end so that when pressure is applied to the center spot disc by said plunger, and such pressure is only momentary, the maximum pressure is developed about the edge of the center spot disc. This is due to the fact that the top of the metal shell 10 is cupped downwardly. The heated plunger 20, however, should have a spherical end conforming to the contour of the top of the metal shell so as to distribute the pressure throughout the entire area of the center spot disc.

It is not my intention to limit the invention to the exact proportions of the solid constituents given herein, since such are capable of considerable variation.

While casein may be dispensed with, I have found that its use permits a more satisfactory practice of the method, and that it facilitates the admixture of an emulsion of albumen with an emulsion of the latex prior to the coating of the strip of center spot material. The amount of water or other vehicle used is immaterial, being determined by the coating methods used in applying the adhesive stratum to the strip material.

The adhesive stratum, in addition to albumen, casein and latex, may contain about two parts of lime, although such is not a material factor in bonding the center spot disc to the cushion disc, being used largely in forming the emulsion with which the strip material is coated.

For purposes of definition, latex may be termed an inert plastic, since its function is largely to serve as a carrier for the active adhesive agents, and its plasticity is not modified as a result of the application of heat in the practice of the method.

Having described the invention, what I claim as new and desire to have protected by Letters Patent is:—

1. A method of making center spot crowns consisting of applying to the cushion disc of a crown, a solvent which will partially emulsify albumen, cutting a center spot disc from a strip of facing material having a thin stratum of adhesive containing albumen and a plastic carrier upon one surface thereof, depositing said disc upon the cushion disc of a crown cap with said coating engaging the solvent upon the cushion disc, and thereafter subjecting said center spot to pressure and heat sufficient to coagulate the albumen in said coating.

2. A method of making center spot crowns consisting of applying to the cushion disc of a crown, a solvent which will partially emulsify albumen, cutting a center spot disc from a strip of facing material having a thin stratum of adhesive containing albumen, casein and a plastic carrier upon one surface thereof, depositing said disc upon the cushion disc of a crown cap with said coating engaging the solvent upon the cushion disc, and thereafter subjecting said center spot to pressure and heat sufficient to coagulate the albumen in said coating.

3. A method of making center spot crowns consisting of applying to the cushion disc of a crown, a solvent which will partially emulsify albumen, cutting a center spot disc from a strip of facing material having a thin stratum of adhesive containing albumen and latex upon one surface thereof, depositing said disc upon the cushion disc of a crown cap with said coating engaging the solvent upon the cushion disc, and thereafter subjecting said center spot to pressure and heat sufficient to coagulate the albumen in said coating.

4. A method of making center spot crowns consisting of applying to the cushion disc of a crown, a solvent which will partially emulsify albumen, cutting a center spot disc from a strip of facing material having a thin stratum of adhesive containing albumen, casein and latex upon one surface thereof, depositing said disc upon the cushion disc of a crown cap with said coating engaging the solvent upon the cushion disc, and thereafter subjecting said center spot to pressure and heat sufficient to coagulate the albumen in said coating.

5. A method of making center spot crowns consisting of applying to the cushion disc of a crown, a solvent which will partially emulsify albumen, cutting a center spot disc from a strip of facing material having a thin stratum of adhesive containing albumen within a range of from eight to sixteen parts, nine parts of casein and twenty-seven parts of latex by weight of the solid constituents of the adhesive upon one surface thereof, depositing said disc upon the cushion disc of a crown cap with said coating engaging the solvent upon the cushion disc, and thereafter subjecting said center spot to pressure and heat sufficient to coagulate the albumen in said coating.

JAY BERNARD EISEN.